(12) United States Patent
Inoue et al.

(10) Patent No.: US 6,198,763 B1
(45) Date of Patent: *Mar. 6, 2001

(54) TRANSMITTER AND RECEIVER FOR SPREAD-SPECTRUM COMMUNICATION

(75) Inventors: Takeshi Inoue, Yokohama; Koji Matsuyama, Kawasaki, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,291

(22) Filed: Sep. 26, 1996

(30) Foreign Application Priority Data

Feb. 16, 1996 (JP) .................................................. 8-029610

(51) Int. Cl.$^7$ ........................................................ A61F 2/06
(52) U.S. Cl. .............................................. 375/130; 375/147
(58) Field of Search ........................... 375/200, 201, 375/206, 208, 209, 367, 207, 343, 279, 210, 344, 130, 147; 370/342, 479, 208, 209, 203; 380/34, 48, 46, 44

(56) References Cited

U.S. PATENT DOCUMENTS

| | | | |
|---|---|---|---|
| 5,687,162 | * 11/1997 | Yoshida et al. | 370/203 |
| 5,689,526 | * 11/1997 | Slonneger et al. | 375/206 |
| 5,715,239 | * 2/1998 | Gilhousen et al. | 370/209 |

FOREIGN PATENT DOCUMENTS 7-46222    2/1995   (JP) .

* cited by examiner

Primary Examiner—William Luther
(74) Attorney, Agent, or Firm—Helfgott & Karas, P.C.

(57) ABSTRACT

Disclosed is a spread-spectrum communication system that can increase an information transmission rate under conditions of a prescribed bandwidth and expansion ratio, and that can obtain chip timing and symbol timing synchronization characteristics comparable to those of a conventional spread-spectrum system. Using a delay element and a selector, a spreading code sequence for a Q-phase signal for quadrature modulation is phase-modulated with second information, whereas no phase modulation is applied to a spreading code sequence for an I-phase signal. At the receiving end, chip timing synchronization and code synchronization are performed for the I-phase signal.

21 Claims, 13 Drawing Sheets

TRANSMITTER AND RECEIVER FOR SPREAD-SPECTRUM COMMUNICATION

BACKGROUND OF THE INVENTION

1. Field of the Invention

The present invention relates to a transmitter and a receiver for spread-spectrum communication employing a direct spreading method, and also relates to a spread-spectrum communication system.

2. Description of the Related Art

In a spread spectrum communication system employing a direct spreading method in which digital information to be transmitted is directly spread with a digital code sequence, when one period of the code sequence is allotted to one bit of information, the bandwidth used expands as the information rate to be transmitted increases, as long as the bit length in one period of the code sequence is fixed. On the other hand, if the information rate is to be increased within a predetermined bandwidth, the expansion ratio must be lowered by reducing the bit length of the code sequence. In other words, in spread-spectrum communication employing the conventional direct spreading method, with a given bandwidth and expansion ratio (bit length of spreading code) the information rate cannot be increased above a certain value.

Japanese Unexamined Patent Publication No. 7-46222 discloses a communication system wherein the code phase of a code sequence for directly spreading the information to be transmitted is modulated in accordance with another information or the code sequence itself is phase-modulated for transmission, thereby achieving the transmission of larger volumes of information than is possible in spread-spectrum communication employing the conventional direct spreading method under conditions of a predetermined bandwidth and spreading code length. In this system, since the code phase in the received signal varies due to the modulation, synchronization cannot be maintained by establishing code synchronization and chip synchronization by computing the correlation between the received signal and the despreading code at the receiving end, as is done in the conventional spread-spectrum communication. In the above patent publication, therefore, synchronization is established by transmitting a special bit pattern in both directions before commencing a communication, and after the synchronization is established, the synchronization is maintained by synchronizing the code sequence at the receiver with the code sequence at the transmitter in the opposite direction.

The above prior art has a problem in that a bit pattern for establishing synchronization needs to be transmitted every time a communication is commenced. Another problem is an inability to cope with phase shifts caused by minute frequency variations after the establishment of synchronization.

SUMMARY OF THE INVENTION

It is an object of the invention to provide a spread-spectrum communication system that can transmit larger volumes of information with a given bandwidth and code sequence length and that can establish and maintain synchronization for a received signal.

According to the present invention, there is provided a transmitter for spread-spectrum communication comprising: a first signal generating section for generating a first signal containing a first code sequence; a second signal generating section for generating a second signal containing a second code sequence phase-modulated with a first information signal; and a modulating section for modulating a carrier with the first and second signals.

According to the present invention, there is also provided a receiver, for spread-spectrum communication, for accepting a received wave consisting of a first signal containing a first code sequence and a second signal containing a second code sequence phase-modulated with a first information signal, and for recovering the information signal, comprising: a demodulating section for demodulating the received wave; a synchronizing section for determining a phase of the first signal by establishing synchronization with the first code sequence contained in the first signal demodulated in the demodulating section; and a first information recovering section for recovering the first information signal by identifying, based on the phase of the first signal, a phase of the second code sequence contained in the second signal demodulated in the demodulating section.

According to the present invention, there is also provided a spread-spectrum communication system comprising: a transmitter including a first signal generating section for generating a first signal containing a first code sequence, a second signal generating section for generating a second signal containing a second code sequence phase-modulated with a first information signal, and a modulating section for modulating a carrier with the first and second signals; and a receiver for accepting a received signal from the transmitter and for recovering an information signal, including a demodulating section for demodulating the received wave, a synchronizing section for determining a phase of the first signal by establishing synchronization with the first code sequence contained in the first signal demodulated in the demodulating section, and a first information recovering section for recovering a first information signal by identifying, based on the phase of the first signal, a phase of the second code sequence contained in the second signal demodulated in the demodulating section.

In the above system, the second code sequence contained in the second signal is phase-modulated with the information signal, whereas the first code sequence contained in the first signal is not phase-modulated; accordingly, synchronization can be established and maintained.

DESCRIPTION OF THE PREFERRED EMBODIMENTS

Figure 1:
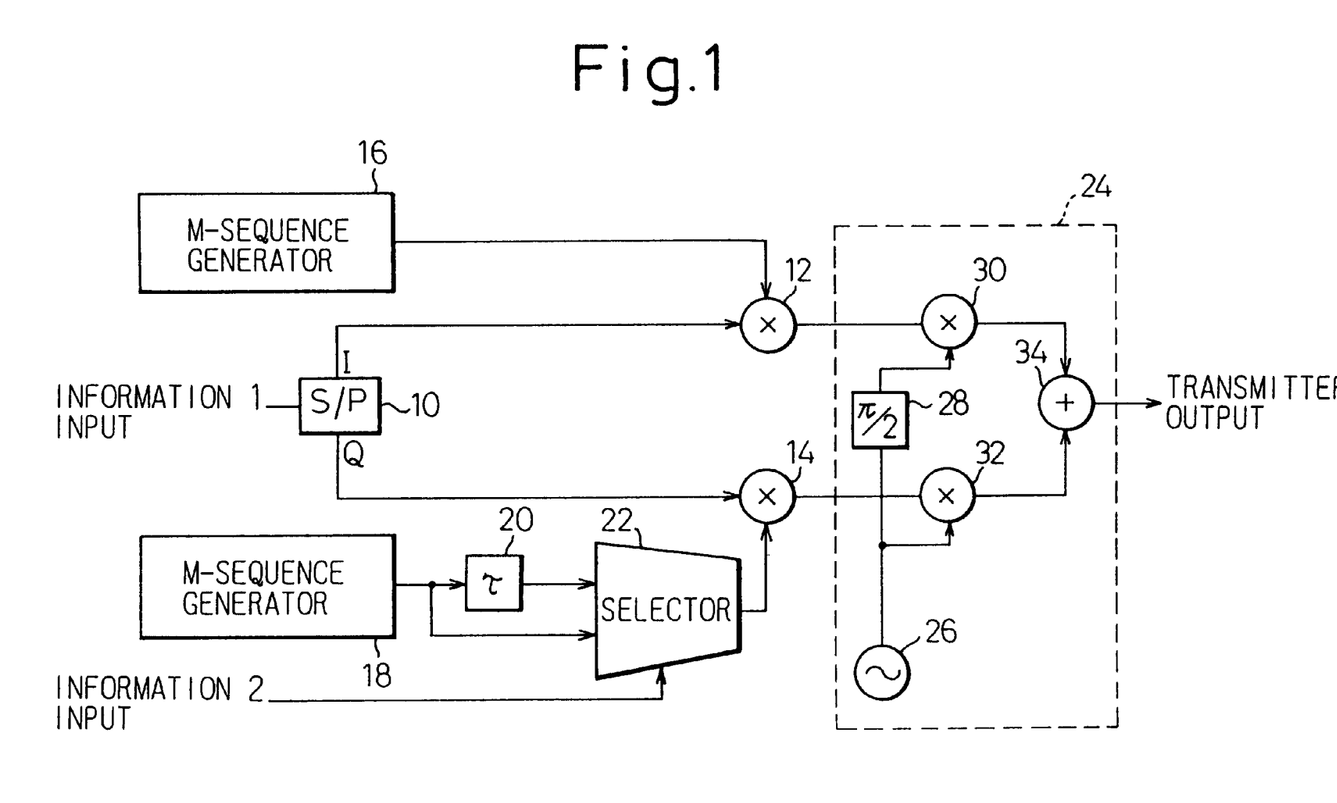
FIG. 1 is a block diagram of a transmitter for spread-spectrum communication according to one embodiment of the present invention.

FIG. 1 is a block diagram of a transmitter for spread-spectrum communication according to one embodiment of the present invention. Information 1 has a bit rate twice that of information 2, and is converted by a serial-parallel converter 10 into a parallel signal of two bits; one bit is applied as an I-phase (in-phase) signal to one input of a multiplier 12 and the other is applied as a Q-phase (quadrature) signal to one input of a multiplier 14. Applied to the other input of the multiplier 12 is an m sequence (maximal code sequence) consisting, for example, of a seven-bit codeword having a rate seven times that of the I-phase signal, or more generally a PN sequence (the same applies hereinafter), generated by an m-sequence generator 16. A seven-bit m sequence output from an m-sequence generator 18 is delayed by one chip through a delay element 20 whose output is coupled to a selector 22 to which the output of the m-sequence generator 18 is also coupled. The information 2 is applied to the selector 22 as a selection signal, depending on whose value the output of the delay element 20 or the output of the m-sequence generator 18 is selected, arid the m sequence phase-modulated with the information 2 is thus output. The output of the selector 22 is applied to the other input of the multiplier 14. The I-phase signal, directly spread by the m sequence in the multiplier 12, and the Q-phase signal, directly spread by the m sequence phase-modulated by the information 2 in the multiplier 14, are fed into a quadrature modulator 24 where quadriphase shift keying (QPSK) modulation is applied for transmission. The quadrature modulator 24 has a known configuration consisting of a local oscillator 26, a delay element 28 for delaying the phase of the output of the local oscillator 26 by 90 degrees, multipliers 30 and 32 for multiplying the spread I-phase and Q-phase signals respectively with locally generated signals in phase quadrature, and a combiner 34 for combining the outputs of the multipliers 30 and 32.

Figure 2:
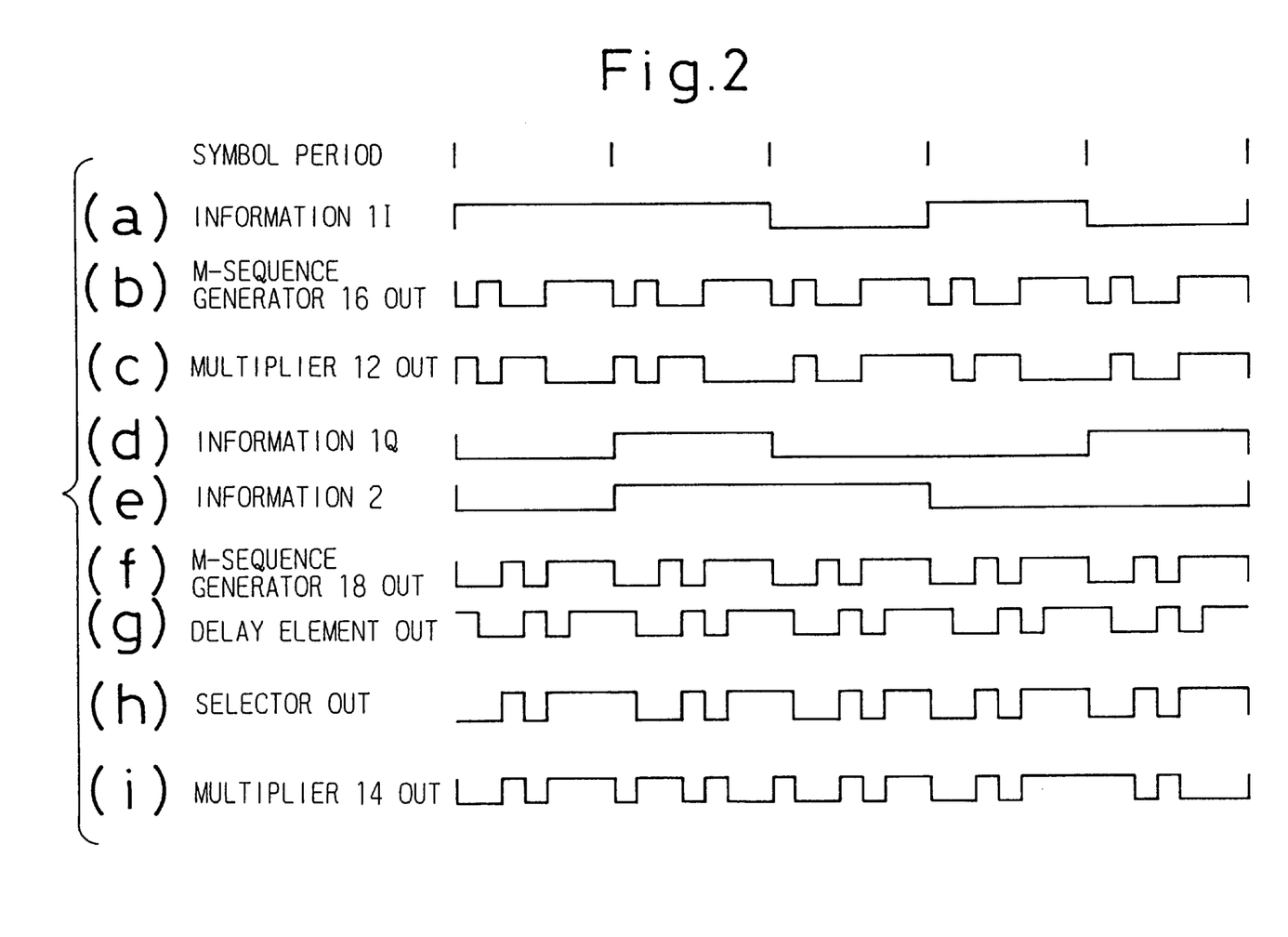
FIG. 2 is a timing chart for explaining the operation of the transmitter of FIG 1.

FIG. 2 is a timing chart for explaining the operation of the transmitter of FIG. 1. The m-sequence generator 16 outputs an m sequence (1110010) as shown in part (b) of the figure. While the I phase of the information 1 (information 1I) shown in part (a) is at the H level, the m sequence in part (b) is phase-reversed and a sequence (0001101) is output from the multiplier 12, as shown in part (c); during the L level period, the m sequence is output unchanged. In this way, the information 1I is directly spread by the m sequence (1110010). The m-sequence generator 18 outputs an m sequence (1110100) as shown in part (f), which is delayed by one chip through the delay element 20 which thus outputs a sequence (1101001) as shown in part (g). While the information 2 shown in part (e) is at the L level, the selector 22 selects the non-delayed m sequence (1110100), and while it is at the H level, selects the delayed m sequence (1101001), as shown in part (h). In this way, the m sequence output from the m-sequence generator 18 is phase-modulated with the information 2. The output of the selector 22 in part (h) is output unchanged from the multiplier 14 while the Q phase of the information 1 (information 1Q) shown in part (d) is at the L level; on the other hand, during the H level period, a phase-reversed sequence is output from the multiplier 14. In this way, the information 1Q is directly spread by the m sequence phase-modulated with the information 2.

Figure 3:
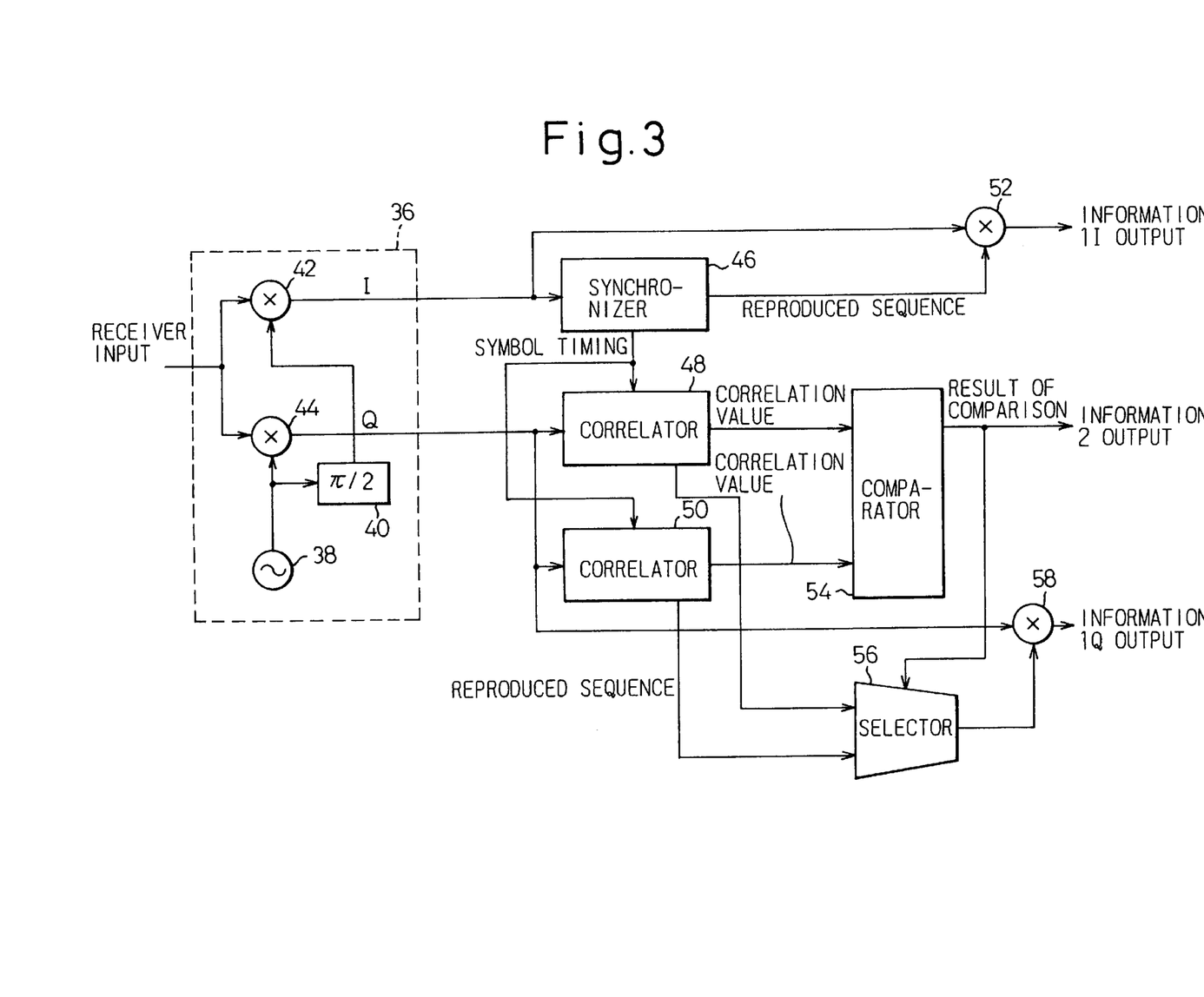
FIG. 3 is a block diagram of a receiver for spread-spectrum communication according to one embodiment of the present invention.

FIG. 3 is a block diagram of a receiver for spread-spectrum communication according to one embodiment of the present invention; the receiver shown is designed to accept a received wave from the transmitter of FIG. 1 and recover the information 1 and 2.

The received wave is input to a quadrature demodulator 36 where the I-phase signal and the Q-phase signal are demodulated. The quadrature demodulator 36 has a known configuration consisting of a local oscillator 38, a delay element 40, and multipliers 42 and 44. A synchronizer 46 reproduces the m sequence contained in the I-phase signal by synchronizing a code sequence having the same codeword (1110010) as the m sequence generated by the m-sequence generator 16 at the transmitter of FIG. 1 with the I-phase signal; the synchronizer 46 also supplies a symbol timing signal to correlators 48 and 50. Tn a multiplier 52, the I-phase signal is despread by the m sequence reproduced by the synchronizer 46, and the information 1I is thus recovered. The correlator 48 reproduces an m sequence, synchronized with the m sequence reproduced by the synchronizer 46 and having the same codeword (1110100) as the m sequence generated by the m-sequence generator 18 at the transmitter of FIG. 1, in accordance with the symbol timing signal supplied from the synchronizer 46, and calculates a correlation value between the thus reproduced m sequence and the Q-phase signal, which is output. The correlator 50 reproduces an m sequence delayed by one chip with respect to the m sequence reproduced by the correlator 48, and calculates a correlation value between it and the Q-phase signal. The correlation values calculated by the correlators 48 and 50 are compared in a comparator 54, and the information 2 is recovered by successively deciding which shows the higher correlation. A selector 56 selects one or the other of the reproduced m sequences output from the correlators 48 and 50, based on the result of the comparison in the comparator 54, and the m sequence phase-modulated with the information 2 is thus recovered. Then, by despreading the Q-phase signal by the recovered m sequence in a multiplier 58, the information 1Q is recovered.

Figure 4:
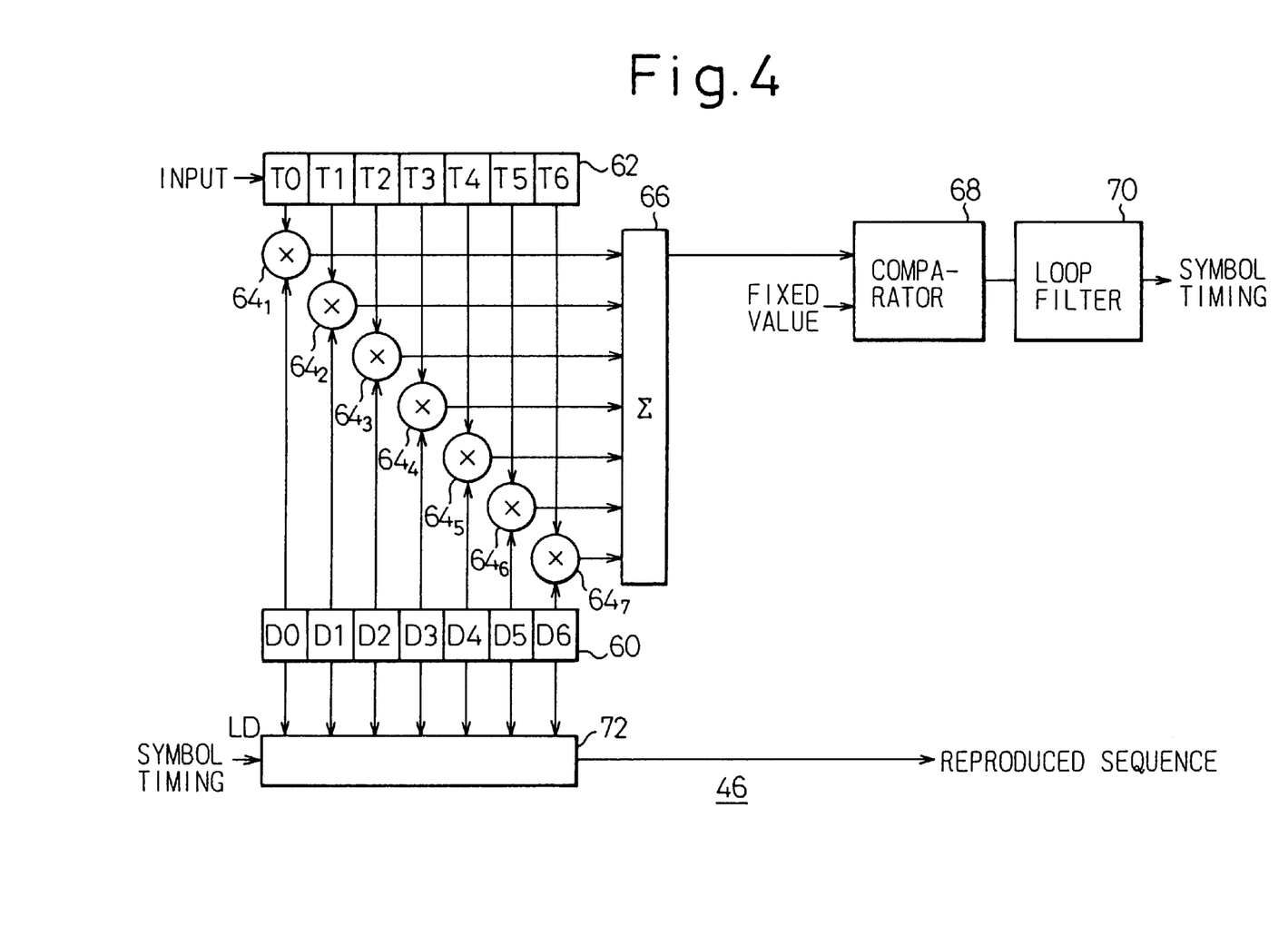
FIG. 4 is a circuit diagram showing the configuration of a synchronizer 46.

FIG. 4 is a circuit diagram showing the configuration of the synchronizer 46 shown in FIG. 3. The same codeword as the code sequence output from the m-sequence generator 16 at the transmitter of FIG. 1 is latched in a latch 60. As an input signal to a shift register 62, the I-phase signal is input one chip at a time. In multipliers $64_{1-7}$, the respective bits from the codeword latched in the latch 60 are multiplied by the corresponding bits of the input signal currently stored in the shift register 62, and the results are summed together in a summer 66, thereby calculating a correlation value between the codeword latched in the latch 60 and the respective bits stored in the shift register 62. This correlation value is compared with a fixed value in a comparator 68, and the result of the comparison is waveshaped in a loop filter 70 to generate a signal representing symbol timing. By this signal, the codeword is loaded into a shift register 72 whose contents are then output one bit at a time, thus reproducing the code sequence code-synchronized to the input signal In practice, the phase of the chip clock (chip phase) applied to the shift registers 62 and 72 must also be synchronized to the input signal; this can be easily accomplished by applying a known delay locked loop (DLL) to the I-phase signal.

Figure 5:
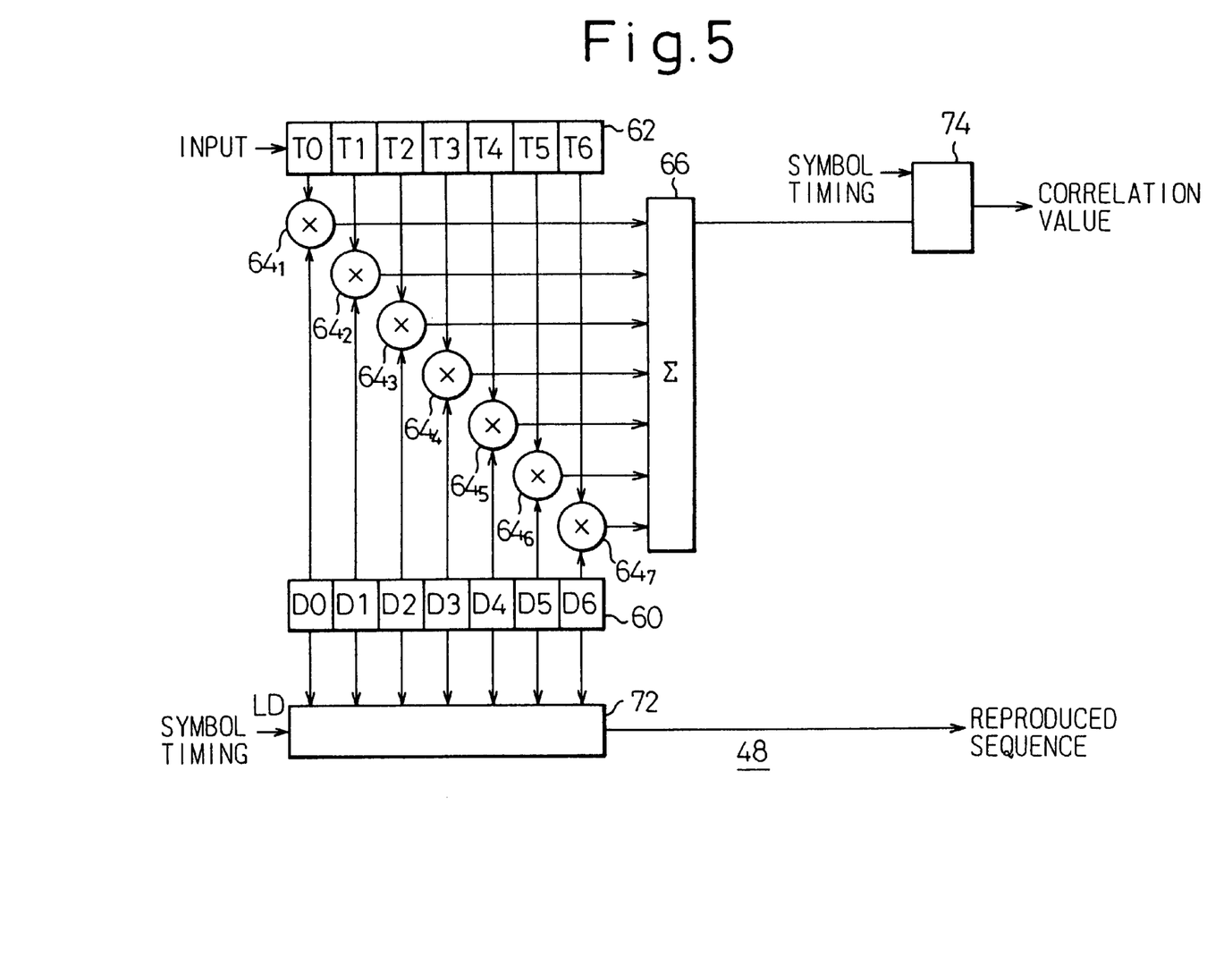
FIG. 5 is a circuit diagram showing the configuration of a correelator 48.

FIG. 5 is a circuit diagram showing the configuration of the correlator 48 shown in FIG. 3. The block for calculating the correlation value for each code phase and the block for outputting the reproduced sequence are the same as those shown in FIG. 4 and therefore, the explanation will not be repeated here. The same codeword as the code sequence output from the m-sequence generator 18 at the transmitter of FIG. 1 is latched in the latch 60. A latch 74 latches the correlation value from the summer 66 in synchronism with the symbol timing supplied from the synchronizer 46.

Figure 6:
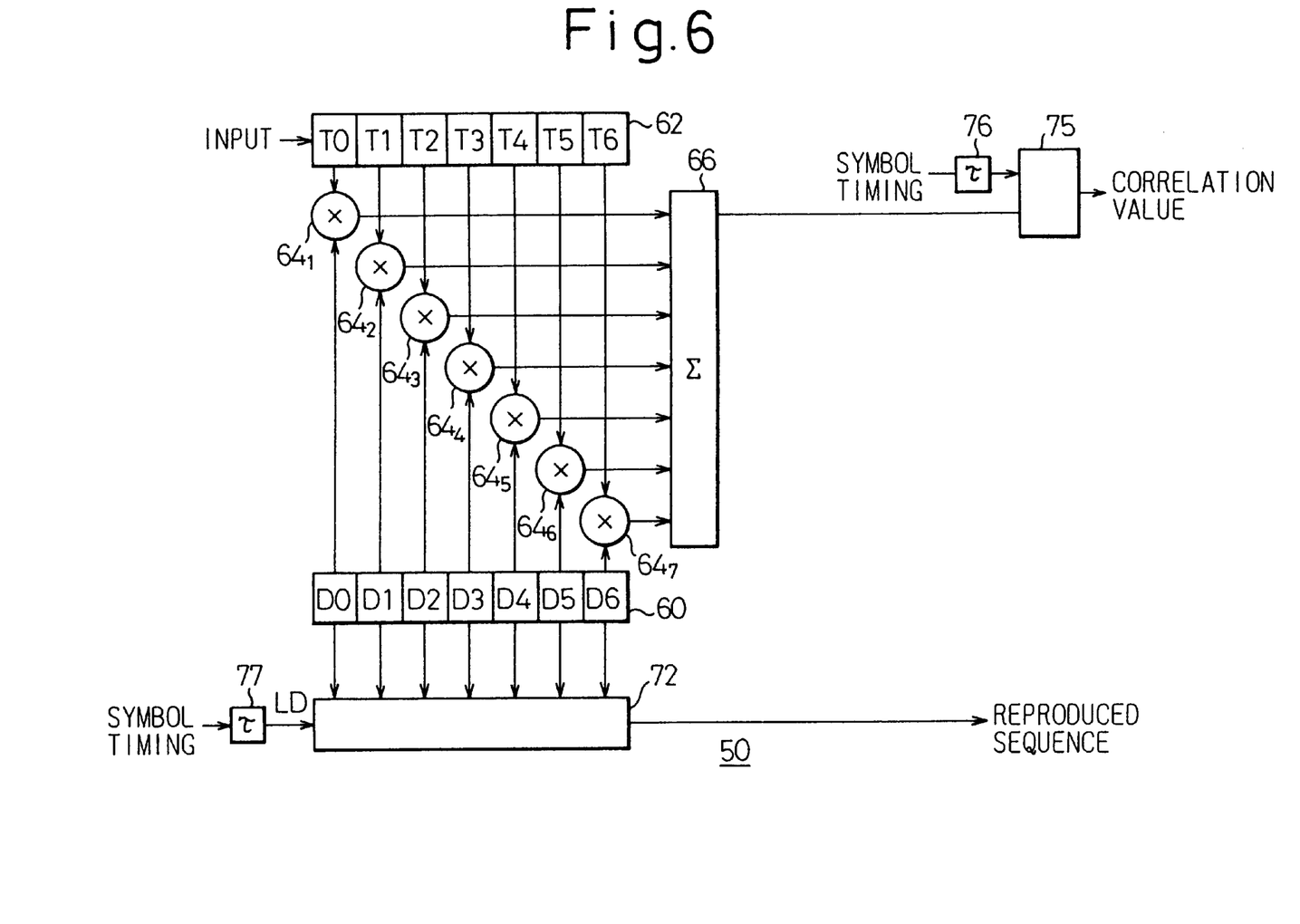
FIG. 6 is a circuit diagram showing the configuration of a correlator 50.
Figure 7:
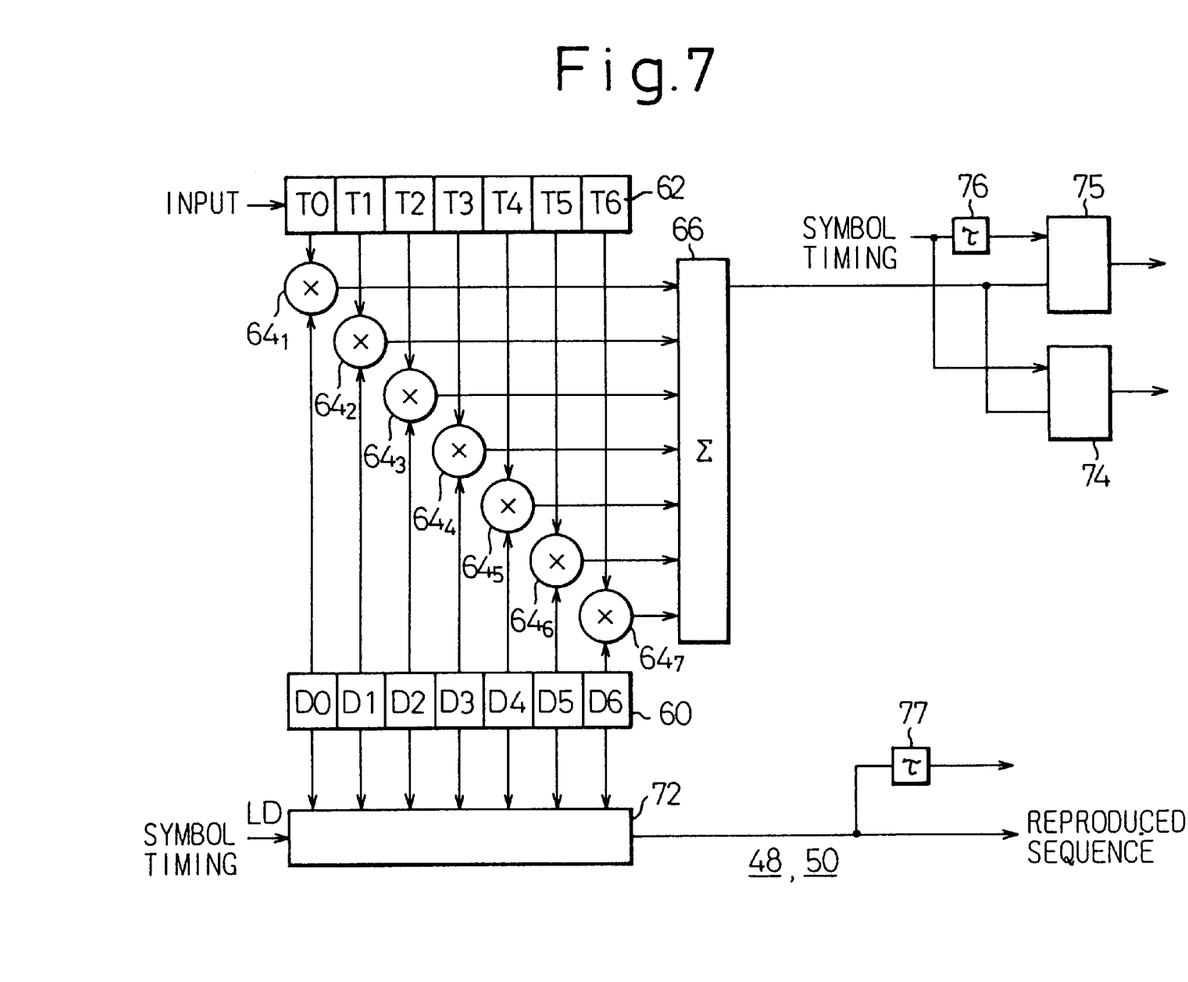
FIG. 7 is a circuit diagram showing an alternative configuration of the correlators 48 and 50.

FIG. 6 is a circuit diagram showing the configuration of the correlator 50 shown in FIG. 3. The symbol timing Lo be applied to the latch 75 and shift register 72 is delayed by one chip through delay elements 76 and 77. Most of the parts of the correlators 48 and 50 can be provided common to them, as shown in FIG. 7.

By combining the transmitter shown in FIG. 1 with the receiver shown in FIG. 3, the spread-spectrum communication system of the invention is constructed.

In the transmitter of FIG. 1, the information signal is first multiplied by the code sequence, and then multiplied by the carrier wave; alternatively, the code sequence may be multiplied by the carrier wave first, and then, the information signal may be multiplied, or the information signal may be first multiplied by the carrier wave and then multiplied by the code sequence. Accordingly, the wording "quadrature-modulating the information signal spread by the code sequence" should be interpreted to include the above three cases.

For simplicity, FIG. 1 shows the configuration in which one or the other of two code phases is selected in one symbol period in accordance with a one-bit information signal; on the other hand, when directly spreading with an m sequence of code length 7, for example, it is possible to employ a configuration in which $2^2=4$ ($\leq 7$) different phases are selected in accordance with a two-bit information signal. Furthermore, if a code sequence of code length $2^n$ is used, such as a code sequence of code length 8 with a 0 added to a seven-bit m sequence, phase modulation can be accomplished by an n-bit information signal though the spreading gain decreases. Moreover, if either the information 1I or 1Q or both are fixed to 0 or 1, erroneous detection can be prevented when using a code sequence with low correlation such as the code sequence of code length $2^n$, though the information rate decreases accordingly. In that case, either multiplier 12 or 14 or both can be eliminated. At the receiver also, the multipliers 52, 58, the selector 56, and the circuitry for reproducing code sequences can be eliminated according to the situation.

It is desirable that the m-sequence generator 16 and the m-sequence generator 18 generate different code sequences, but they may generate the same code sequence.

In the receiver configuration illustrated in FIG. 3, provisions are not specifically shown for the elimination of a phase ambiguity, the possibility of outputting the I-phase signal instead of the Q-phase signal or vice versa, but this can be accomplished by inserting a synchronization word or by employing differential encoding; another way to accomplish this is by using a difference between code sequences and picking, for example, a demodulated output having high correlation with the code sequence used on the I-phase channel as the I-phase signal.

Figure 8:
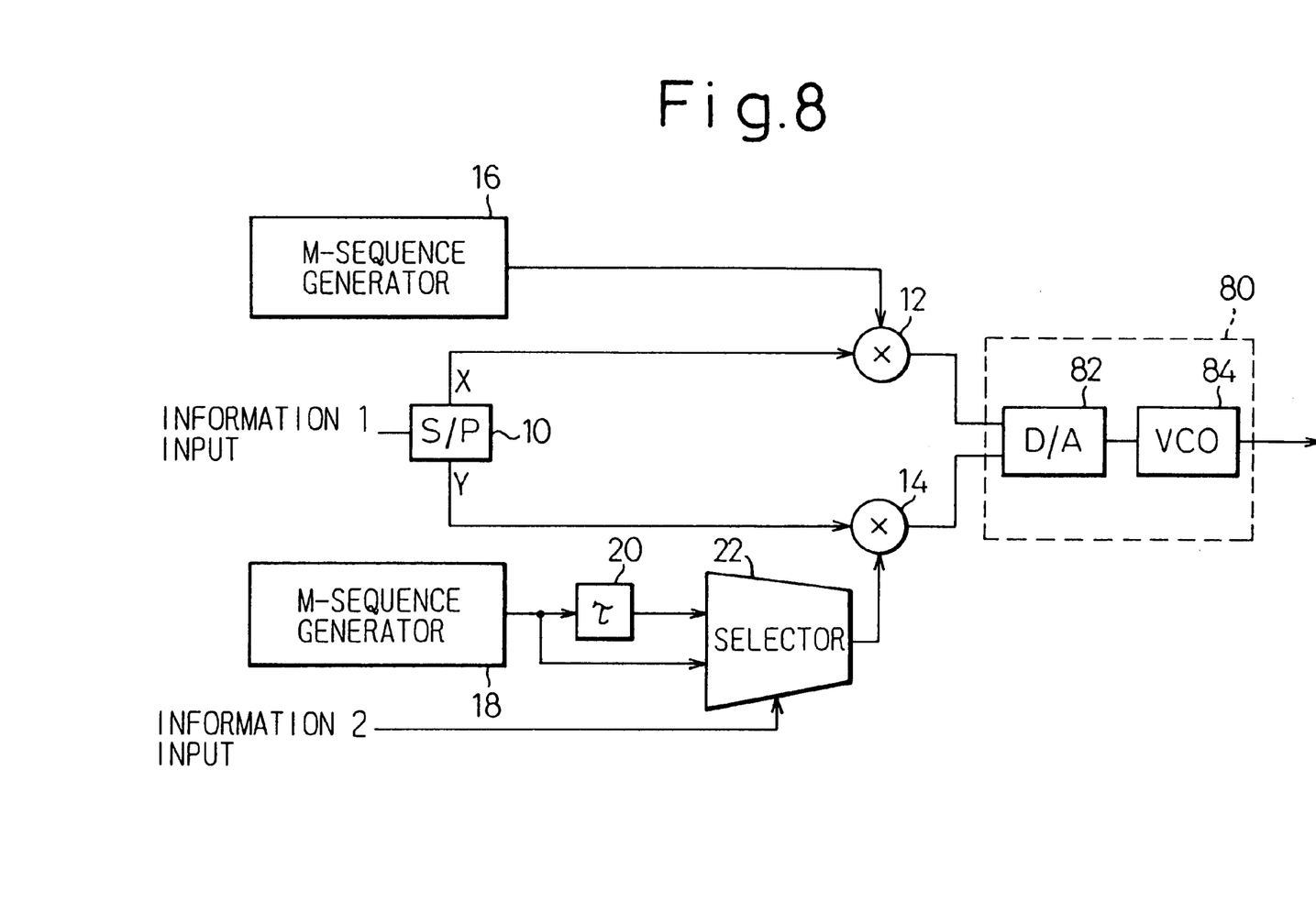
FIG. 8 is a block diagram of a transmitter for spread-spectrum communication according to another embodiment of the present invention.

FIG. 8 is a block diagram of a transmitter for spread-spectrum communication according to another embodiment of the present invention. The transmitter shown in FIG. 8 is the same as the transmitter shown in FIG. 1, except that the quadrature modulator 24 in FIG. 1 is replaced by a multi-level modulator 80. The multilevel modulator 80 consists of a D/A converter 82 for converting each of the bits X and Y of a parallel signal, converted by the serial-parallel converter 10 from two successive bits of the information 1, into a four-level signal, and a voltage-controlled oscillator (VCO) 84 for generating a 4FSK modulated signal by outputting a signal of a frequency proportional to the output. voltage of the D/A converter 82. If the VCO 84 is replaced by an amplitude modulator that amplitude-modulates the amplitude of a local oscillation signal with the output of D/A 82, then 4ASK modulation is accomplished.

Figure 9:
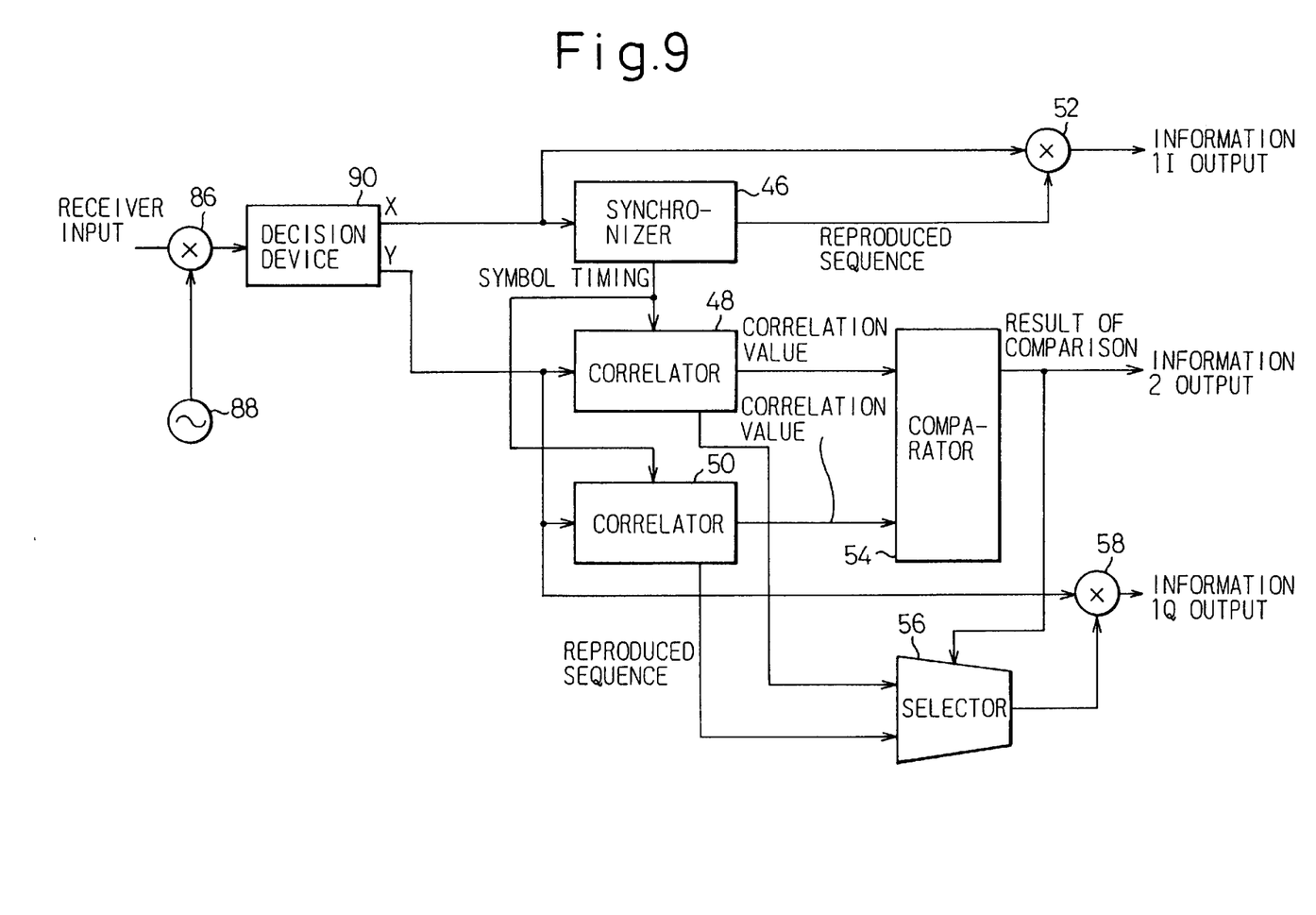
FIG. 9 is a block diagram of a receiver for spread-spectrum communication according to another embodiment of the present invention.

FIG. 9 shows the receiver configuration. In a mixer 86, a local oscillation signal from a local oscillator 88 is mixed to obtain the baseband signal and, in a decision device 90, a decision is made based on the frequency in the case of 4FSK modulation, or based on the amplitude in the case of 4ASK modulation, thus obtaining the signals X and Y. The subsequent processing is the same as described in connection with FIG. 3. Accordingly, all the modifications described for the system of FIGS. 1 and 3 are also possible in the case of the multilevel modulation. In multilevel modulation such as 4FSK or 4ASK, since X and Y are uniquely determined by identifying the frequency or amplitude of the received signal, the problem of phase ambiguity inherent in quadrature modulation does not arise. The special processing for the elimination of phase ambiguity as previously described is therefore not needed.

In the system employing the quadrature modulation explained with reference to FIGS. 1 and 3, if the multilevel amplitude modulation of FIGS. 8 and 9 is additionally applied to each of the signals I and Q, a system accomplishing multiphase amplitude modulation such as quadrature amplitude modulation (QAM) can be easily realized. in this case, the code phase of one channel is fixed, and by reference to this code phase, the code phase of the other channel is judged.

Figure 10:
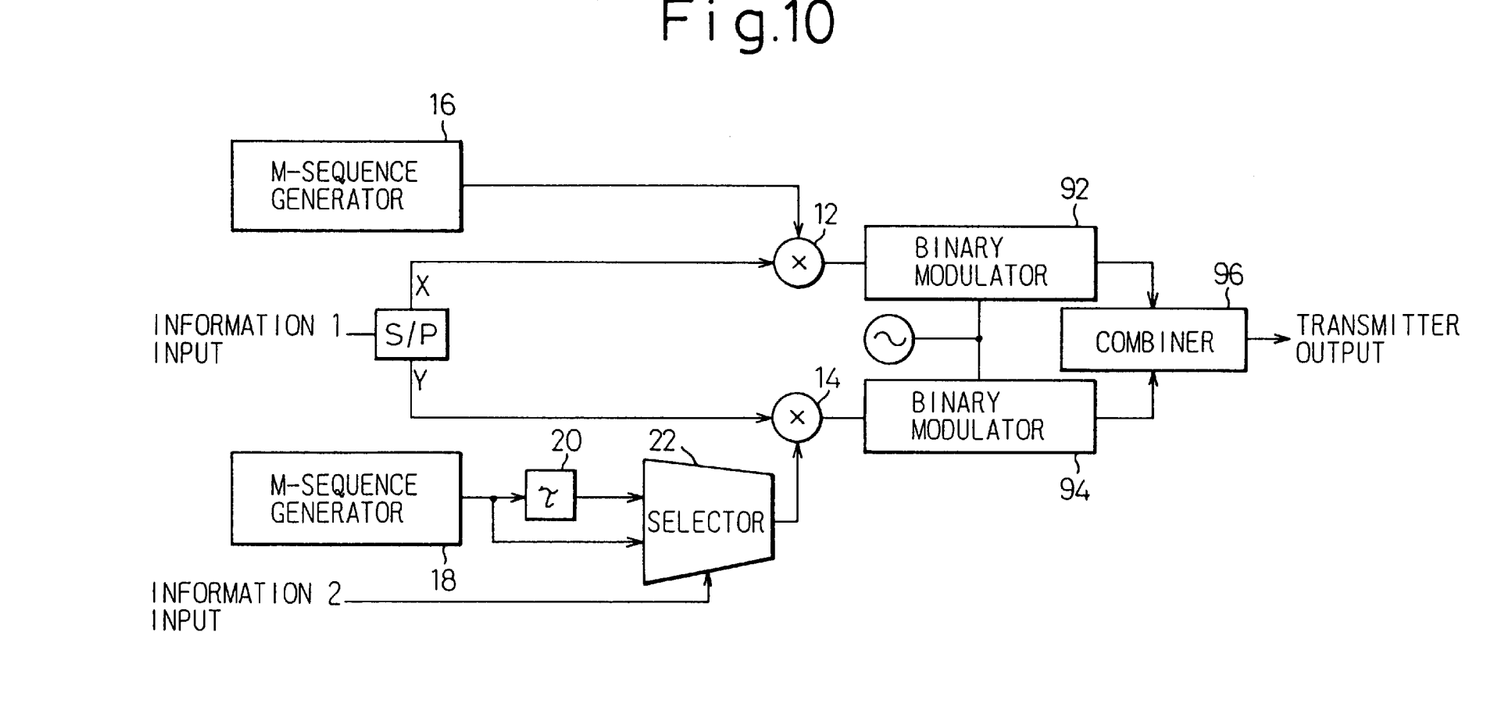
FIG. 10 is a block diagram of a transmitter for spread-spectrum communication according to another embodiment of the present invention.

FIG. 10 is a block diagram of a transmitter for spread-spectrum communication according to still another embodiment of the present invention. In the transmitter of FIG. 10, the multilevel modulator 80 in FIG. 8 is replaced by a block consisting of binary modulators 92, 94 for modulating the signals X and Y, respectively, each directly spread by an m sequence, and a combiner 96 for combining their outputs for code division multiplexing. Since code division multiplexing is employed, it is desirable that the m-sequence generators 16 and 18 generate m sequences of different codewords, but if provisions are made so that their code phases do not coincide, they may generate the same codeword.

Figure 11:
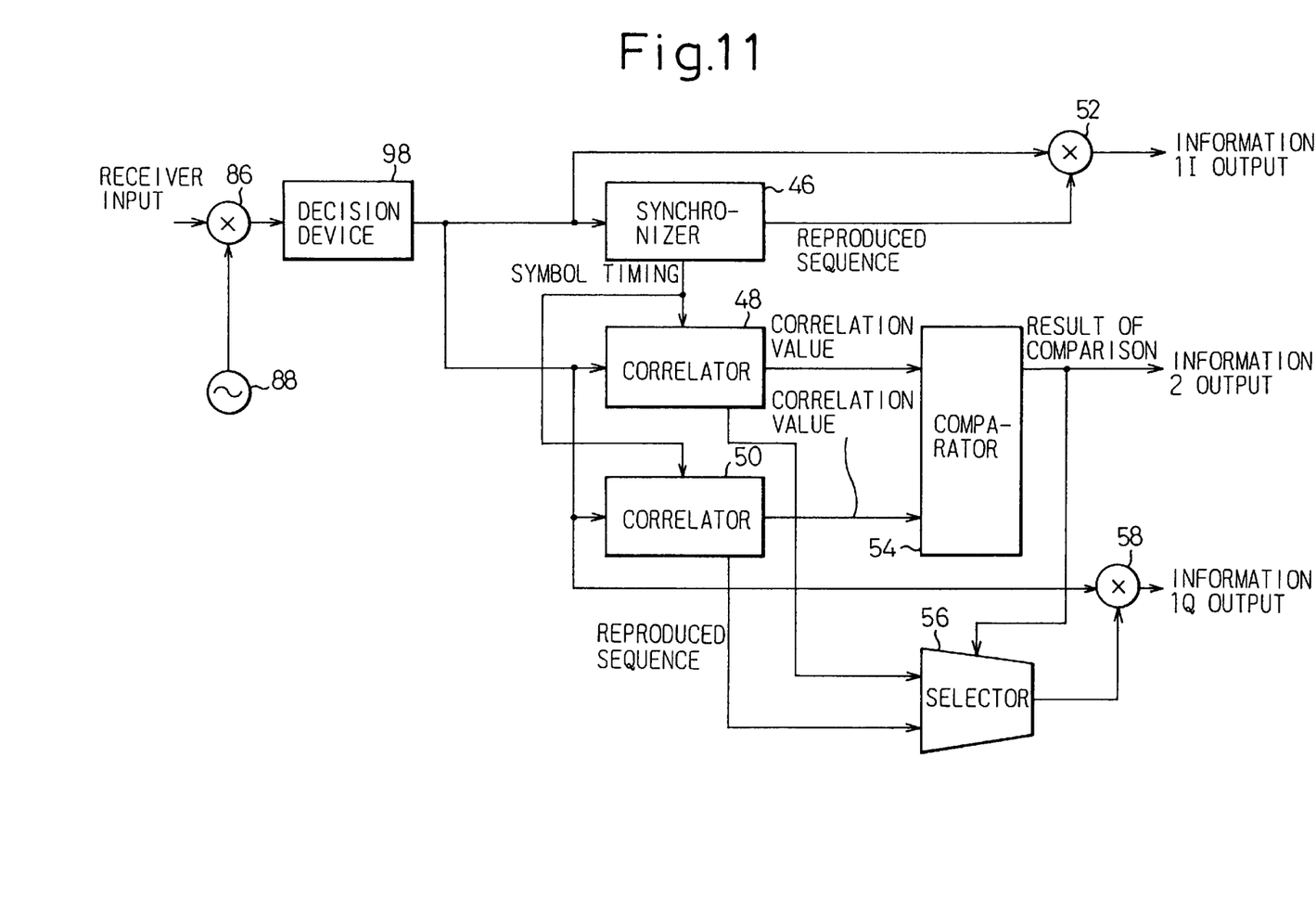
FIG. 11 is a block diagram of a receiver for spread-spectrum communication according to another embodiment of the present invention.

FIG. 11 shows the receiver configuration. In a decision device 98, a receiver input is converted into a binary signal, and the output is supplied in parallel to the synchronizer 46 and the correlators 48, 50. Information signals are separated by using the difference between the codewords or code phases.

In the system of FIGS. 10 and 11, it is also possible to replace the binary modulation by the multilevel modulation configuration shown in FIGS. 8 and 9. In this case also, one of the plurality of channels is not phase-modulated and used as the reference for the phases of the other channels.

Figure 12:
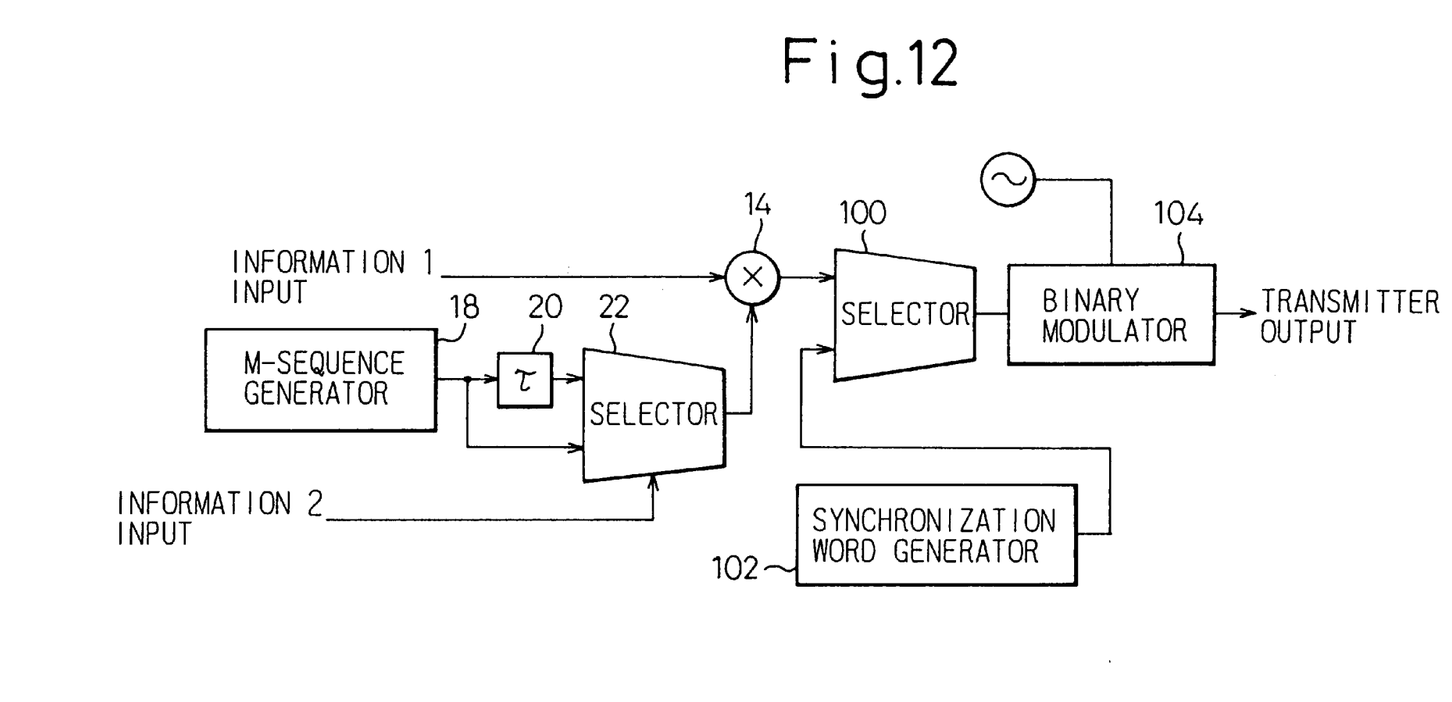
FIG. 12 is a block diagram of a transmitter for spread-spectrum communication according to another embodiment of the present invention.

FIG. 12 is a block diagram of a transmitter for spread-spectrum communication according to yet another embodiment of the present invention. In the multiplier 14, the information 1 is directly spread with the m sequence phase-modulated with the information 2, and in a selector 100, a synchronization word from a synchronization word generator 102 is inserted in the output of the multiplier 14 at prescribed intervals of time, the resulting sequence then being subjected to modulation in a binary modulator 104. It is desirable that a code sequence having high correlation with all possible code sequences be used as the synchronization word. For example, a sequence of successive 0s for all chips within one symbol and a sequence of 1s are inserted alternately.

Figure 13:
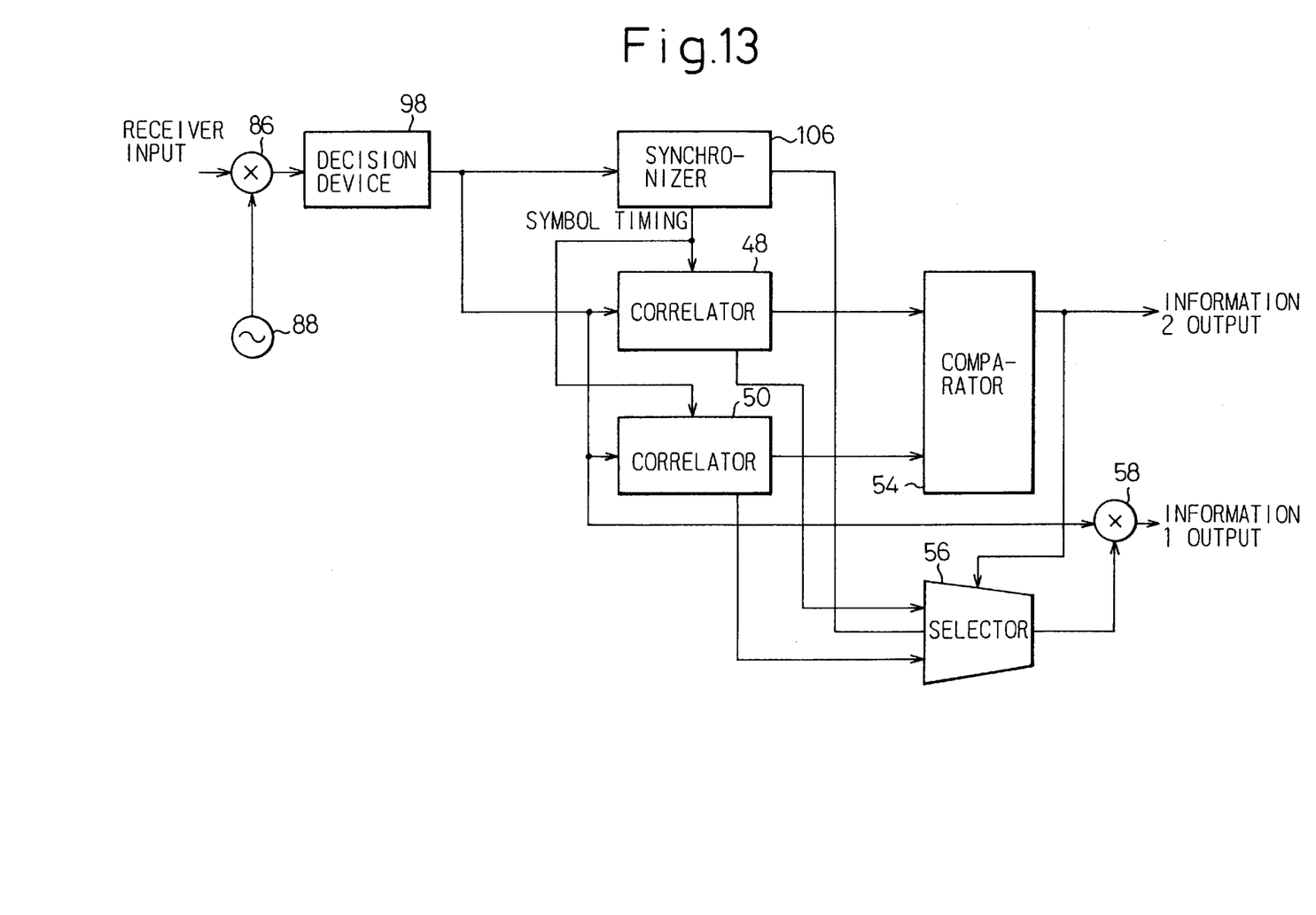
FIG. 13 is a block diagram of a receiver for spread-spectrum communication according to another embodiment of the present invention.

FIG. 13 shows the receiver configuration. The synchronizer 106 may be constructed in the same configuration as that of the synchronizer 46 shown in FIG. 4, but requires the provision of a protection circuit for successively outputting symbol timing for the synchronization words inserted at prescribed intervals.

As described above, according to the present invention, transmission capacity can be increased under conditions of a limited bandwidth and a prescribed expansion ratio, and furthermore, the chip timing and symbol timing synchronization characteristics comparable to those of conventional spread-spectrum communication can be obtained.

What is claimed is:

1. A transmitter for spread-spectrum communication, said transmitter splitting a first information signal into two split information signals, individually spreading the two split information signals with a first code sequence and a second code sequence, respectively, and transmitting the spread signals, said transmitter comprising:
   a first signal generating section generating a first signal by spreading one of the two split information signals with a first code sequence; and
   a second signal generating section generating a second signal by spreading the other of the two split information signals with a second code sequence phase-modulated so as to have a phase difference from a reference phase, said phase difference being based on a value of a second information signal.

2. A transmitter for spread-spectrum communication comprising:
   a first signal generating section for generating a first signal containing a first code sequence;
   a second signal generating section for generating a second signal containing a second code sequence phase-modulated with a first information signal; and
   a modulating section for modulating a carrier with the first and second signals;
   wherein the second signal generating section includes:
      a code sequence generator for generating the second code sequence;
      a delay element for delaying the output of the code sequence generator and thereby generating a plurality of code sequences having different code phases; and
      a selector for selecting and outputting one of the plurality of code sequences according to the value of the first information signal and thereby generating the phase-modulated second code sequence.

3. A transmitter according to claim 1, wherein the second signal generating section includes a multiplier for generating the second signal by directly spreading the other of the two split signals information signals with the phase-modulated second code sequence.

4. A transmitter according to claim 1, wherein the first signal generating section includes a multiplier for generating the first signal by directly spreading the one of the two split information signals with the first code sequence.

5. A transmitter according to claim 1, further comprising a quadrature modulator which accepts the first signal and the second signal as an in-phase signal input and a quadrature signal input, respectively.

6. A transmitter according to claim 1, further comprising a modulating section including:
   a signal converter for converting the first and second signals into a multi-valued signal having a plurality of different values, with each of possible combinations of the values of the first and second signals corresponding to one of the different values; and
   a modulator for modulating the carrier with the multi-valued signal.

7. A transmitter according to claim 1, further comprising a modulating section including:
   first and second modulators for modulating the carrier with the first and second signals respectively; and
   a combiner for combining the outputs of the first and second modulators to produce a transmitted signal.

8. A transmitter for spread-spectrum communication comprising:
   a first signal generating section for generating a first signal containing a first code sequence;
   a second signal generating section for generating a second signal containing a second code sequence phase-modulated with a first information signal; and
   a modulating section for modulating a carrier with the first and second signals;
   wherein the first signal generating section generates as the first signal a synchronization work consisting of the first code sequence, and
   the modulating section includes:
      a selector for alternately selecting one of the first and the second signal for output, and
      a modulator for modulating the carrier with the output of the selector.

9. A transmitter according to claim 1, wherein the second code sequence has a code length of a power of two.

10. A transmitter according to claim 1, wherein the first code sequence and the second code sequence have codewords identical to each other.

11. A receiver for spread-spectrum communication, for receiving a first signal including a spread signal generated by spreading one of two split information signals derived from the first information signal with a first code sequence, and receiving a second signal including a spread signal generated by spreading the other of the two split information signals with a second code sequence phase-modulated so as to have a phase difference from a reference phase of said first code sequence, said phase difference being based on a value of a second information signal, said receiver comprising:
   a first information signal recovering section recovering the one of the two split information signals by despreading the first signal with the first code sequence;
   a second information signal recovering section recovering the other of the two split information signals by despreading the second signal with the second code sequence, and recovering the second information signal based on a phase difference determined by comparing a phase of the second code sequence with a phase of the first code sequence as the reference phase in the first information signal recovering section.

12. A receiver for spread-spectrum communication, for accepting a received wave consisting of a first signal containing a first code sequence and a second signal containing a second code sequence phase-modulated with a first information signal, comprising:

a demodulating section for demodulating the received wave, to thereby output the first and second signals;

a synchronizing section for determining a phase of the first signal by establishing synchronization with the first code sequence contained in the first signal output from the demodulating section; and a first information recovering section for recovering the first information signal by identifying, based on the phase of the first signal, a phase of the second code sequence contained in the second signal output from the demodulating section;

wherein the first information recovering section includes:

a plurality of correlators for respectively calculating correlation values between the second signal and a plurality of code sequences having the same codeword as the second code sequence but respectively having different code phases relative to the phase of the first signal; and a comparator for comparing the correlation values calculated by the plurality of correlators with each other and successively determining a code sequence having the highest correlation with the second signal, thereby recovering the first information signal.

13. A receiver according to claim 12, wherein the second signal is generated by directly spreading a second information signal with the phase-modulated second code sequence, the receiver further comprising a second information recovering section which includes:

a selector for successively selecting a code sequence having the highest correlation with the second signal from among the plurality of code sequences on the basis of the recovered first information signal; and a multiplier for recovering the second information signal by multiplying the code sequence selected by the selector with the second signal.

14. A receiver according to claim 12, wherein the first signal is generated by directly spreading a third information signal with the first code sequence, and the synchronizing section outputs a code sequence having the same codeword as the first code sequence contained in the first signal and synchronized to the first code sequence, the receiver further comprising a third information recovering section which includes a multiplier for recovering the third information signal by multiplying the code sequence output from the synchronizing section with the first signal.

15. A receiver according to claim 11, wherein the received signal consists of carriers quadrature-modulated with the first signal and second signal as an in-phase signal input and a quadrature signal input, respectively, said receiver further comprising a quadrature demodulator for quadrature-demodulating the received signal and outputting the first and second signals.

16. A receiver according to claim 11, wherein the received signal consists of a carrier modulated with a multi-valued signal each value of which corresponds to each possible combination of the values of the first and second signals, said receiver further comprising a multilevel demodulator for multilevel-demodulating the received wave and outputting the first and second signals.

17. A receiver according to claim 11, wherein the received signal consists of carriers respectively modulated with the first and second signals and combined together.

18. A receiver according to claim 11, wherein the received signal contains the first signal and the second signal in alternate fashion.

19. A receiver according to claim 11, wherein the second code sequence has a code length of a power of two.

20. A receiver according to claim 11, wherein the first code sequence and the second code sequence have codewords identical to each other.

21. A spread-spectrum communication system, comprising:

a transmitter including a first signal generating section generating a first signal by spreading one of two split information signals derived from a first information signal with a first code sequence, and a second signal generating section generating a second signal by spreading the other of the two split signals with a second code sequence phase-modulated so as to have a phase difference from a reference phase of said first-code sequence, said phase difference being based on a value of a second information signal; and a receiver including a first information signal recovering section recovering the one of the two split information signals by despreading the first signal with the first code sequence, and a second information signal recovering section recovering the other of the two split information signals by despreading the second signal with the second code sequence, and recovering the second information signal based on a phase difference determined by comparing a phase of the second code sequence with a phase of the first code sequence as the reference phase in the first information signal recovering section.

* * * * *